United States Patent

[11] 3,583,708

[72] Inventor Jay H. Prager
116, 1-chome Nishiosaki, Shinagawa-Ku,
Tokyo, Japan

[21] Appl. No. 536,493
[22] Filed Feb. 8, 1966
[45] Patented June 8, 1971

[54] AUTOMATIC TAPE TRACK SELECTOR
2 Claims, 3 Drawing Figs.

[52] U.S. Cl. .......... 274/4, 179/100.2
[51] Int. Cl. .......... G11b 5/00
[50] Field of Search .......... 170/100.2 CA, 100.2 D, 100.2 MI; 274/4

[56] References Cited
UNITED STATES PATENTS
2,468,198 4/1949 Heller .......... 179/100.2
3,388,911 6/1968 Wilson, et al. .......... 274/4

*Primary Examiner*—Leonard Forman
*Assistant Examiner*—Dennis A. Dearing
*Attorney*—Edward D. O'Brian

ABSTRACT: A magnetic tape deck is disclosed which includes a structure for shifting the tape recording head on the deck in response to the construction of a tape cartridge used with the deck. This structure includes a detection member adapted to be engaged by certain cartridges to indicate the nature of the tape tracks on the tapes within such cartridges, a cam adapted to be shifted by the detection member, and a cam follower engaged with the cam so as to shift the recording head to different positions corresponding to tape tracks on the tapes within the cartridges used.

INVENTOR
JAY H. PRAGER
BY
EDWARD D. O'BRIAN
ATTORNEY

INVENTOR
JAY H. PRAGER
BY
EDWARD D. O'BRIAN
ATTORNEY

AUTOMATIC TAPE TRACK SELECTOR

This invention is directed to an automatic tape track selector, and particularly to a track selector adaptable to position a magnetic tape reading head in accordance with the number of tracks on the tape, and to detect the number of tracks on the tape by the characteristics of the cartridge in which the tape is contained.

Magnetic tapes where the rendition of music is recorded thereon are presently available in many different storage and utilization structures. The ordinary tape reel, which is well known and has been widely used in the past, is an example of the manner in which tape can be used. The ordinary tape reel stores the tape, and when it is unwound past an appropriate reading head, and wound upon another reel the signal thereon is read. To those who have used tape decks which employ such reels, it is clear that they are unhandy for the tape has a tendency to unwind, before being placed on the deck, and it needs to be threaded through the tape head and arranged for winding upon an empty reel. This is all time consuming, cumbersome and unhandy. To alleviate these difficulties, tape is now available in cartridges. Some of these cartridges contain both winding and unwinding reels. These cartridges overcome some of the difficulties of the previous tape reel system, but in turn present difficulties of their own. Engagement of the reels to drive them to wind up and rewind makes it difficult to simply slip a cartridge into an appropriate tape deck suited for it. Thus, another advance was made in the art. This advance comprises the provision of an endless tape within the cartridge. Thus, tape windup and rewind problems have been alleviated for the withdrawal of tape to the reading head provides the motive power to draw the tape back into storage within the cartridge after it has been read. This invention is directed in preference to this latter type of cartridge, although it is applicable also to those cartridges which contain two reels.

While such endless tape cartridges are standardized in configuration, and are interchangeable between present tape decks arranged for such cartridges, there is a difference between the recordings on the tape. Some of the tapes in such decks are recorded with four tracks so as to provide two separate stereophonic renditions. Such are referred to herein as 4-track recordings or 4-track tapes. However, technological advance in tape reading heads has even further miniaturized them so that 8-tape tracks can be recorded on and reproduced from a standard one-fourth inch tape. Thus, they are capable of recording and producing for rendition four separate stereo renditions. Such will be referred to in this specification as eight-track recordings or eight-track tapes. Since these two different kinds of recorded tape are available in the same cartridges, while the cartridges are interchangeable, an eight-track tape cannot be reproduced on a tape deck which is designed to employ 4-track recordings.

It is an object of this invention to provide a tape deck which is capable of accepting standard cartridges having either 4- or 8-track recordings, to discriminate the nature of the recording and to appropriately adjust the tape deck to properly read the recording.

It is another object of this invention to provide a tape deck which is capable of reading either 4-track or 8-track tapes and to properly adjust the tape deck so that the correct head positions are obtained to read the tape in the cartridge.

It is a further object of this invention to discriminate between four- and eight-track tapes, housed in virtually identical standard cartridges, by discriminating a physical characteristic of the cartridge and to use this discrimination to properly adjust the tape deck.

It is a further object of this invention to provide structure which adjusts the position of the tape reading head so that a new position is obtained by correctly moving the head in accordance with the number of tracks thereon after the continuous tape in the cartridge has been completed a full passage through the head.

It is another object of this invention to provide a tape deck which is capable of electrically selecting between a plurality of different head structures so that the proper head structure is electrically connected in accordance with the character of the recording on the tape, and to determine this recording head by the physical characteristics of the tape cartridge which houses the tape.

Other objects and advantages of this invention will become apparent from a study of the following portion of this specification, the claims and the attached drawings in which:

As an aid to understanding this invention it can be stated in essentially summary form that it is directed to a tape deck. The tape deck is provided with heads suitable for simultaneous reading of two tracks on an 8-track tape. The tape deck is arranged to accept a standard cartridge of recorded tape. In order to distinguish between 4-track tape and 8-track tape within the cartridge, the cartridge is provided with a characteristic which can be detected by the tape deck to determine if 4- or 8-track tape is present in the tape cartridge. In the preferred embodiment, the tape cartridge is provided with a physical difference to detect between these tape characters. The tape deck is provided with positioning means to position the tape reading heads in accordance with the tracks on the tape. The positioning means includes first and second cams. One of the cams is suitable for one tape character and the other cam is suitable for the other tape character. Detection means detects the difference in cartridges and selects the suitable cam so that the tape head is properly positioned.

In the preferred embodiment, the tape cartridge has a continuous tape therein which has signal means thereon to indicate one complete circuit of the tape through the cartridge and past the reading head. When this signal is read by the tape deck, the tape deck appropriately actuates the cam so that the heads are shifted to a different pair of tracks. With a four-track tape, two complete stereo renditions are possible. With an eight-track tape, four complete stereo renditions are possible. Thus, the cam arranged for the four-track tape provides two positions for the pair of tape heads. On the other hand, when operating in the appropriate mode for eight-track tape, the cam has four positions to appropriately position the tape reading head in four different locations for correct tape reading.

In view of the fact that a tape head appropriate for reading the track on an 8-track tape is only half the width of one appropriate for reading a track on a 4-track tape, the use of an 8-track head on a four-track tape does not produce full output. Therefore, in another embodiment, two different pairs of heads can be provided. One of these pairs of heads is dimensionally appropriate for 8-track use, while the other is dimensionally appropriate for four-track use. Thus, in addition to selecting the appropriate cam for appropriate head positioning, a switch can be actuated by the detection means, which switch connects into the electronic audio circuit that one of the sizes of head which is to be active.

Figure 1:
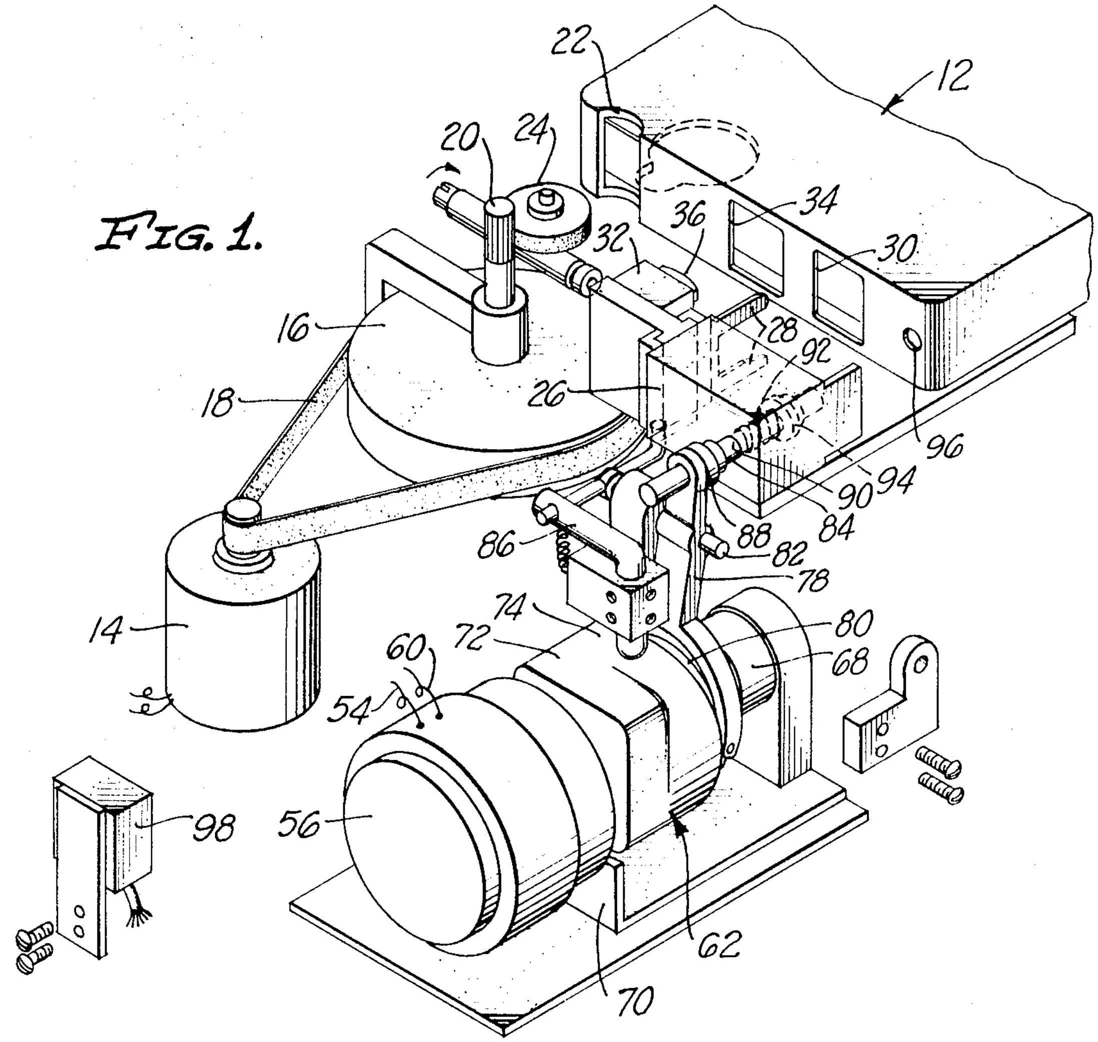
FIG. 1 is an isometric view of the structure of the tape deck in accordance with this invention, shown in association with a cartridge.

This invention will be understood in greater detail by reference to the following portion of this specification wherein the drawings are described. Referring now particularly to FIG. 1, the automatic tape track selector of this invention is generally indicated at 10. The tape track selector 10 forms a portion of a tape deck which contains the other necessary requirements for storage, transportation and reading of a magnetic tape and amplifying the tape signal. Among the various components in the system, which cooperate with the selector of this invention, is tape cartridge 12. Tape cartridge 12 is of structure well known in the art, and such are illustrated in Eash U.S. Pat. No. 2,778,880, Eash U.S. Pat. No. 2,876,005 and Schober U.S. Pat. No. 3,023,943. The tape cartridge 12 may have modifications applied thereto as is discussed below. However, the tape cartridge 12 is preferably of standard construction as is shown in these patents and preferably any modification made thereto is subtractive rather than additive so that commercially available cartridges may be employed. In order to eliminate unnecessary length to this specification, the disclosures of the above identified three patents are incorporated herein in their entirety by this reference.

The tape in the cartridge must be advanced. To accomplish this advance, conventional drive structure is employed. Such drive structure is illustrated in Schober U.S. Pat. No. 3,023,943. In the instant drawings, such drive structure is illustrated schematically and includes motor 14 which drives flywheel 16 by means of belt 18. Capstan 20 is driven by flywheel 16. Capstan 20 is engaged in recess 22 in cartridge 12 when cartridge 12 is in the playing position. The tape is directly engaged by capstan 20 to be advanced through the cartridge 12. In order to maintain proper drive conditions, pinch roll 24 extends up into the cartridge and engages the tape behind capstan 20, as is well described in Eash U.S. Pat. No. 2,876,005 and Schober U.S. Pat. No. 3,023,943. Thus, this much of the structure is conventional and well known.

Figure 3:
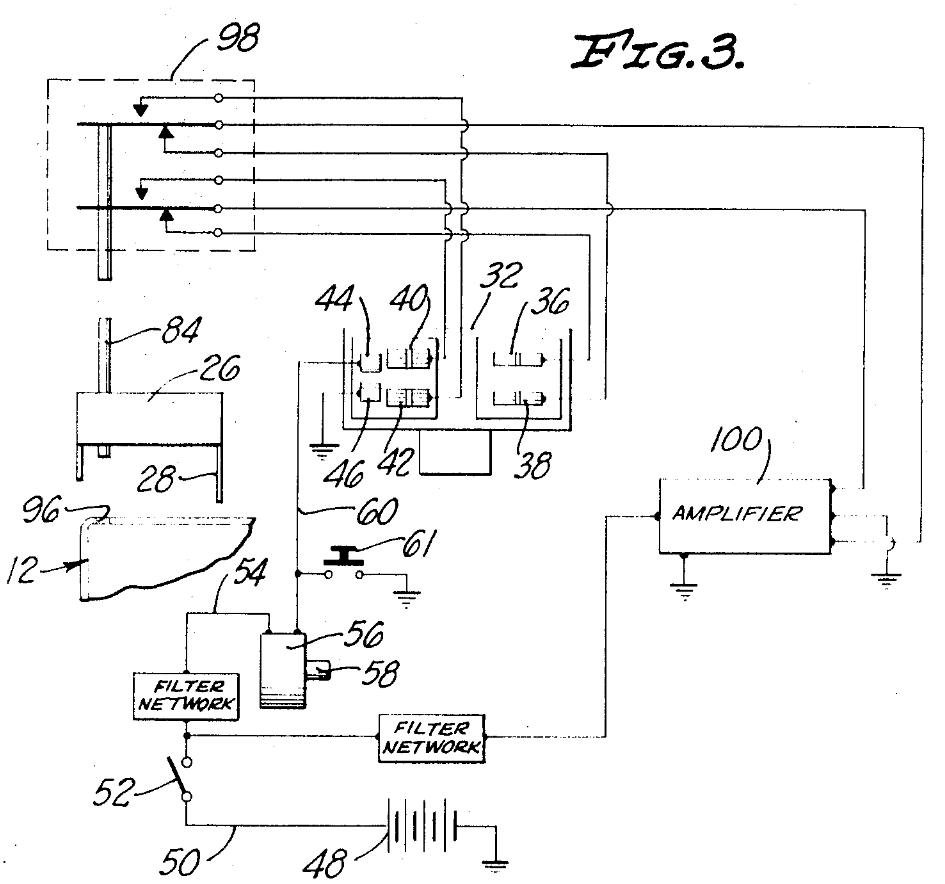
FIG. 3 is a schematic electrical circuit used in connection with the tape deck structure of this invention.

As the cartridge is engaged into the tape deck tape guide 26 engages the front of the cartridge 12. Tape guide fingers 28 enter into an opening 30 to engage around the edges of the tape for lateral guidance thereof. Tape head 32 enters into opening 34 to engage the surface of the tape and read the magnetic signals thereon. As is indicated in FIG. 3, tape head 32 preferably carries tape reading heads 36 and 38 thereon. Tape reading heads 36 and 38 are of such width and such spacing as to read two of the tracks on an 8-track tape. They are spaced in such a manner as to read tracks 1 and 5, when the tape tracks are numbered sequentially from edge to the other. To obtain proper tape reading, tape head 32 must be exactly positioned transversely or crosswise with respect to the tape so that the tape reading heads 36 and 38 are aligned with the desired tracks. Furthermore, means must be provided to shift the tape head 32 with respect to the tape in accordance with which pair of tracks is to be read. Thus, with an 8-track tape, there must be four discreet transverse positions of the tape head 32 with respect to the tape. However, when tape reading heads 36 and 38 are to be used with a 4-track tape, they must be appropriately transversely positioned with respect to the tape to read the tracks on such tape. However, when the tape is only provided with 4-track the tape head 32 can only take two discreet positions wherein it reads a pair of signals from the tape. Furthermore, these positions are preferably different than any of the four positions required for 8-track tape.

Of course, on a 4-track tape the tape signal widths are twice as wide as the tape reading heads 36 and 38. Thus, when the 4-track recordings are read with the tape reading heads 36 and 38, the signal output is not as strong as it would be when a pair of full track width reading heads were used. Thus, tape reading heads 40 and 42 may be provided upon tape head 32. Tape reading heads 40 and 42 are identical to tape reading heads 36 and 38, except for their width. They are of an appropriately wider width so that the full signal strength is developed on the wider tracks. However, this full signal strength is the only benefit for suggesting the additional tape reading heads 40 and 42, and therefore they are not employed in the preferred embodiment of this invention.

When a plurality of stereo tracks are provided, it is desirable to shift from one pair of tracks to another pair of tracks. In the preferred embodiment of the cartridge 12, the tape is continuous and therefore the same pair of channels would play out onto the tape reading heads 36 and 38, unless the tape head 32 is relatively shifted with respect to the tape after a complete circuit has been made of the tape in cartridge 12. A signal to indicate one complete circuit of the tape is provided by placing upon the tape a conductive strip, such as laminating aluminum foil thereto. This conductive strip may appear on either, or both sides of the tape, but preferably appears on the magnetic side. Brushes 44 and 46 are positioned on tape head 32. These are electrically connected in such a manner as to indicate the presence of the conductive strip on the tape. Thus, every time the tape makes a complete circuit through the cartridge 12 a signal is emitted by the electrical conductivity of the tape, in conjunction with brushes 44 and 46.

As is illustrated in FIG. 3, electric power is supplied from a suitable source, such as a battery 48 or other convenient source, and is connected by line 50 to on-off switch 52. Switch 52 is connected by line 54 to the coil of rotary solenoid 56 which has an output shaft 58. Rotary solenoids of the type illustrated are well known and are commercially available. They are available on the commercial market under the trade name "Ledex." They are arranged so that when an input signal is applied, and the rotary solenoid coil is energized, the output shaft 58 rotates a definite rotary increment. Furthermore, shaft 58 continuously rotates, in a step-by-step fashion without any need for reset to an original position. Accordingly, shaft 58 steps forward step-by-step as repeated signals are applied to rotary solenoid 56. Line 60 is connected to the coil of rotary solenoid 56 and to brush 44. Thus, each time the conductive portion of the tape comes past brush 44, rotary solenoid 56 makes one step forward. Push button 61 is also connected to line 60 so that manual closure thereof supplies the signal to rotary solenoid 56 to cause a one-step advance thereof. As is shown below, this moves tape head 32 so that a different pair of channels is positioned in association with tape reading heads 36 and 38.

Figure 2:
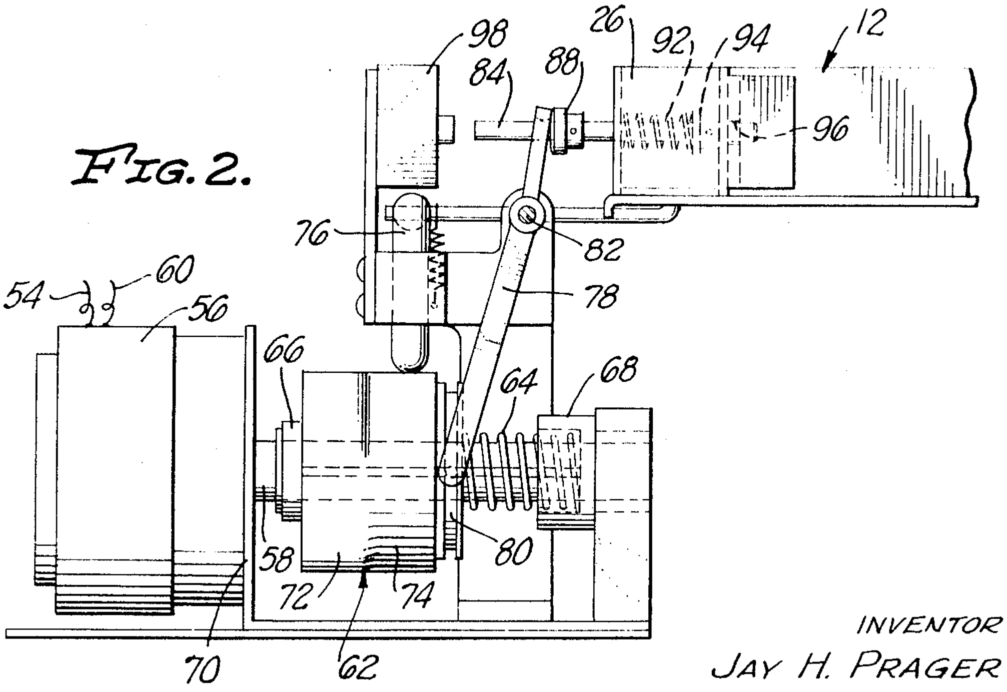
FIG. 2 is an enlarged side elevational view of the cam structure which positions the tape heads in accordance with this invention.

Referring again to FIG. 1, and also to FIG. 2, mounted upon shaft 58 is cam assembly 62. Cam assembly 62 rotates with the shaft 58, but is slidable therealong. Cam assembly 62 is urged to the left, as seen in FIG. 2, by means of spring 64 which engages against cam assembly 62 and against bearing 68 axially related to the shaft, and which supports the end of the shaft and is secured to solenoid frame 70. The left end limit of motion of cam assembly 62 upon shaft 58 is determined by washer 66 which is axially secured upon shaft 58. Thus, in the absence of any other forces upon cam assembly 62, the left end of cam assembly 62 engages against washer 66.

Cam assembly 62 has cam surfaces 72 and 74. Cam surfaces 72 and 74 are respectively arranged with four different radial heights, suitable for positioning head 32 in four different positions to read the four different pairs of tracks on an 8-track tape, and arranged with two different heights to appropriately read the two different pairs of tracks 4-track a four-track tape. Cam follower 76 is appropriately positioned to detect the radial position of cam surface 72 when cam assembly 62 is in the left-hand position shown. Cam follower 76 is connected to head 32 so that the cam surface determines the transverse position of tape head 32 with respect to the tape in cartridge 12. Thus, as shaft 58 and cam assembly 62 move in successive increments of actuation of rotary solenoid 56, tape head 32 is moved to a new position. Of course, these positions correspond to the four different pairs of tracks on an 8-track tape when cam follower 76 is under control of cam surface 72. Similarly, cam surface 74 controls cam follower 76 so that tape head 32 is appropriately moved for the two different positions of pairs of tracks on a 4-track tape. The surfaces on cam surfaces 72 and 74 are all faired together so that cam assembly 62 may be shifted upon shaft 58 and cam follower 76 appropriately reads the surface upon the cam.

Yoke 78 engages in collar 80 secured to the cams in cam assembly 62. Yoke 78 is pivoted at 82 so that pivoting about the pivot point 82, and engagement of yoke 78 in the clutch shifter groove in collar 80 permits control of the cam assembly 62 by yoke 78. As previously described, in the absence of external forces upon yoke 78, cam assembly 62 remains in the leftward position shown in FIG. 2.

Detector pin 84 extends through hole 86 in yoke 78, outside of pivot 82. Collar 88 is fixed on detector pin 84 and engages against yoke 78. Detector pin 84 also extends through guide hole 90 in tape guide 26 so that it extends exteriorly thereof. Spring 92 embraces detector pin 84, adjacent its end interiorly of tape guide 26 and spring retainer 94 is secured to detector pin 84. Thus, spring 92 urges detector pin 84 to the right, toward tape cartridge 12.

When tape cartridge 12 contains an 8-track tape, hole 96 is provided in the corner thereof. Hole 96 is positioned in alignment with detector pin 84 so that as the tape cartridge 12 is placed in the tape deck, detector pin 84 enters into hole 96 and is unactuated. Thus, cam assembly 62 remains in the position shown in FIG. 2 with cam follower 76 on 8-track cam surface 72. However, when a 4-track cartridge 12 is placed in the deck tape, hole 96 is absent. In this case, the edge of the cartridge 12 engages the end of detector pin 84 and thrusts it to the leftward direction, in FIG. 1. This action thrusts cam assembly 62 to the right, compressing springs 64 and 92, so that cam follower 76 is in engagement with cam surface 74, which properly positions tape head 32 for a four-track tape.

In those cases where it is desirable to use tape reading heads 40 and 42, in addition to the tape reading heads 36 and 38, it becomes necessary to switch between the heads in accordance with the character of the tape being read. The end of detector pin 84 extends to switch 98 which is appropriately connected to the several tape reading heads and to the amplifier 100 in the tape audio reproducing structure so that when detector pin 84 is unactuated, the 8-track tape reading heads 36 and 38 are connected to amplifier 100. However, when detector pin 84 is moved to contact with a tape cartridge 12 which contains a 4-track tape, switch 98 is actuated to disconnect tape reading heads 36 and 38 and connect tape reading heads 40 and 42 to the amplifier 100. Thus, electrical interconnection is also made.

This invention having been described in its preferred embodiment, it is clear that it is susceptible to numerous modifications and changes within the skill of those versed in the art, and without the exercise of the inventive faculty. Accordingly, the scope of this invention is defined by the scope of the following claims.

I claim:

1. A magnetic tape deck, said magnetic tape deck being adapted to receive a cartridge containing recorded magnetic tape having separate recordings on more than one channel, said tape deck being adapted to advance the tape within the cartridge;

a tape reading head means having first and second tape reading heads on said tape deck, said tape reading head means being adapted to engage the magnetic tape within the cartridge and convert magnetic signals on the magnetic tape into electrical signals, said first and second tape reading heads being spaced from each other and being adapted to read separate channels on the tape in the tape cartridge;

a rotary cam made up of first and second cam surfaces on said tape deck;

a cam follower in engagement with said cam, said cam follower being connected to said tape reading head;

said cam being formed so that when said cam follower is in engagement with one portion of said surface on said cam, said tape reading head is in proper alignment to be adapted to read one channel on the tape in the tape cartridge and when said follower is in contact with another portion of said cam, said tape head is positioned to be adapted to read another channel on the multiple channel magnetic tape in the tape cartridge;

detection means on said tape deck, said detection means being adapted to distinguish between first and second classes of cartridges adapted to be inserted in said tape deck, rotary motive means having a rotary shaft, said cam being mounted on said shaft for rotation thereby, said rotary motive means being a rotary solenoid, said rotary solenoid being capable of advancing in successive increments upon successive energization thereof, said rotary solenoid being adapted to be energized by the completion of a traverse of the tape within the cartridge, spring means urging said cam in a first direction along said shaft to a first position, said cam follower being positioned adjacent said first cam surface when said cam is in said first position, said detection means being connected to said cam means to axially move said cam along said shaft, said detection means causing said cam to be positioned in said first position when a tape cartridge of the first class is detected, said detection means moving said cam along said shaft so that said second cam surface is engaged by said cam follower when a tape cartridge of second class is detected, said detection means being a pin, said pin being detected on said tape deck so that it engages a hole in the cartridge of the first class and engages on the surface of the cartridge of the second class when such cartridges are inserted in the tape deck.

2. The tape deck of claim 1 wherein there are first and second pairs of first and second tape reading heads in said tape deck and first and second amplifiers in said tape deck, switch means in said tape deck, said switch means connected between said first and second pairs of tape reading heads and said first and second amplifiers, said detection means being connected to said switch means so that when said detection means detects a cartridge of the first class, said first and second tape reading heads of said first pair of tape heads are electrically connected respectively to said first and second amplifiers and when said detection means detects a cartridge of the second class, said first and second tape heads of said second pair of tape heads are respectively electrically connected to said first and second amplifiers.